(12) United States Patent
Dechant et al.

(10) Patent No.: US 9,312,562 B2
(45) Date of Patent: Apr. 12, 2016

(54) BATTERY CELL PLATE FRAME ASSEMBLY AND METHOD

(75) Inventors: Daniel A. Dechant, Richmond, KY (US); Jason D. Holt, St. Charles, IL (US); Robert R. Schaser, Hampshire, IL (US); Glenn Heavens, Cheshire, CT (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 839 days.

(21) Appl. No.: 13/549,754

(22) Filed: Jul. 16, 2012

(65) Prior Publication Data

US 2013/0052507 A1  Feb. 28, 2013

Related U.S. Application Data

(60) Provisional application No. 61/529,489, filed on Aug. 31, 2011.

(51) Int. Cl.
| | |
|---|---|
| *H01M 4/00* | (2006.01) |
| *H01M 10/04* | (2006.01) |
| *H01M 2/34* | (2006.01) |
| *H01M 4/73* | (2006.01) |
| *H01H 85/22* | (2006.01) |
| *H01H 85/02* | (2006.01) |

(52) U.S. Cl.
CPC .......... *H01M 10/0486* (2013.01); *H01H 85/22* (2013.01); *H01M 2/348* (2013.01); *H01M 4/73* (2013.01); *H01H 2085/025* (2013.01); *H01M 2200/103* (2013.01); *Y10T 29/49108* (2015.01)

(58) Field of Classification Search
CPC .................... H01M 2200/103; H01M 10/0486
See application file for complete search history.

(56) References Cited

U.S. PATENT DOCUMENTS 6,152,776 A * 11/2000 Ikeda et al. .................... 439/627

\* cited by examiner

*Primary Examiner* — Maria J Laios
(74) *Attorney, Agent, or Firm* — Leydig, Voit & Mayer, Ltd.

(57) ABSTRACT

The battery cell plate frame assembly comprising a frame, and a sub-assembly comprising a conductive cell plate connector bracket, a conductive terminal, a fuse interposed between the connector bracket and the terminal and a non-conductive bridge separately supporting the connector bracket, the terminal and the fuse. In one form, the connector bracket and terminal include planar elements frictionally connected to the bridge. The bridge includes grasping prongs to releasably support the fuse. The fuse includes a wire connected to the connector bracket and a wire connected to the terminal.

18 Claims, 4 Drawing Sheets

BATTERY CELL PLATE FRAME ASSEMBLY AND METHOD

CROSS REFERENCE TO RELATED APPLICATION

This application claims priority pursuant to Title 35 U.S.C. §119(e) to provisional application No. 61/529,489, filed Aug. 31, 2011, the entire specification and drawings of which are incorporated by reference herein as if fully set forth.

BACKGROUND

This disclosure relates to manufacture of frame assemblies for battery cell plates. In particular, it relates to the provision of a pre-assembled sub-assembly for connection to such a frame that includes a connector bracket, a terminal and an operable fuse interposed between the connector bracket and terminal.

In the manufacture of batteries, separate lead plates are often surrounded by a molded plastic frame. The frame supports the lead plate within the cell comprised of multiple plates. The frame includes a conductive connector bracket that provides a conductive path to the lead plate and a terminal that provides a conductive path to the remainder of the battery assembly.

Typically, the molded frame includes an electrically conductive connector bracket at one end in electrical contact with the lead plate forming the cell. A terminal is also supported on the frame that electrically links the plate to a conductor bus or the like. The terminal and connector bracket are electrically linked through a fuse that protects the battery plate. It is a fuseable link that isolates the lead plate from the remainder of the assembly on occurrence of an internal fault or other disruption.

In the manufacture of individual plate frame assemblies, it is known practice to separately attach the conductive connector bracket and the terminal to the molded plastic frame of the battery plate frame. Thereafter, the fuse between the separate connector bracket and terminal is installed to establish the conductive path.

Manufacture of the battery cell plate frame assembly is time consuming and requires several separate operations. The frame must be molded, the connector bracket and terminal attached and the fuse installed. To simplify the overall assembly process and permit remote manufacture of partially assembled components, it has been contemplated to create a pre-assembled sub-assembly that can be attached to the molded plastic frame to complete the battery cell plate frame assembly.

Initial efforts included integration of the conductive components with each other and the fuse, for later affixation to the non-conductive frame. However, this approach required a subsequent stamping operation to electrically isolate the connector bracket from the terminal to render the interposed fuse operational. This step introduced the risk of contamination of the final assembly through possible formation of undesirable metal slivers. Moreover, inspection of the integrity of the fuse could not be accomplished prior to completion of the frame assembly.

SUMMARY OF THE DISCLOSURE

The battery cell plate frame assembly of the present disclosure incorporates a pre-assembled conductive cell plate connector bracket, a conductive terminal and fully functional interposed fuse. The conductive components are supported upon a non-conductive bridge and are electronically connected only through the fuse. The bridge separately supports the fuse and integrates the components to form the sub-assembly.

DETAILED DESCRIPTION

Figure 1:
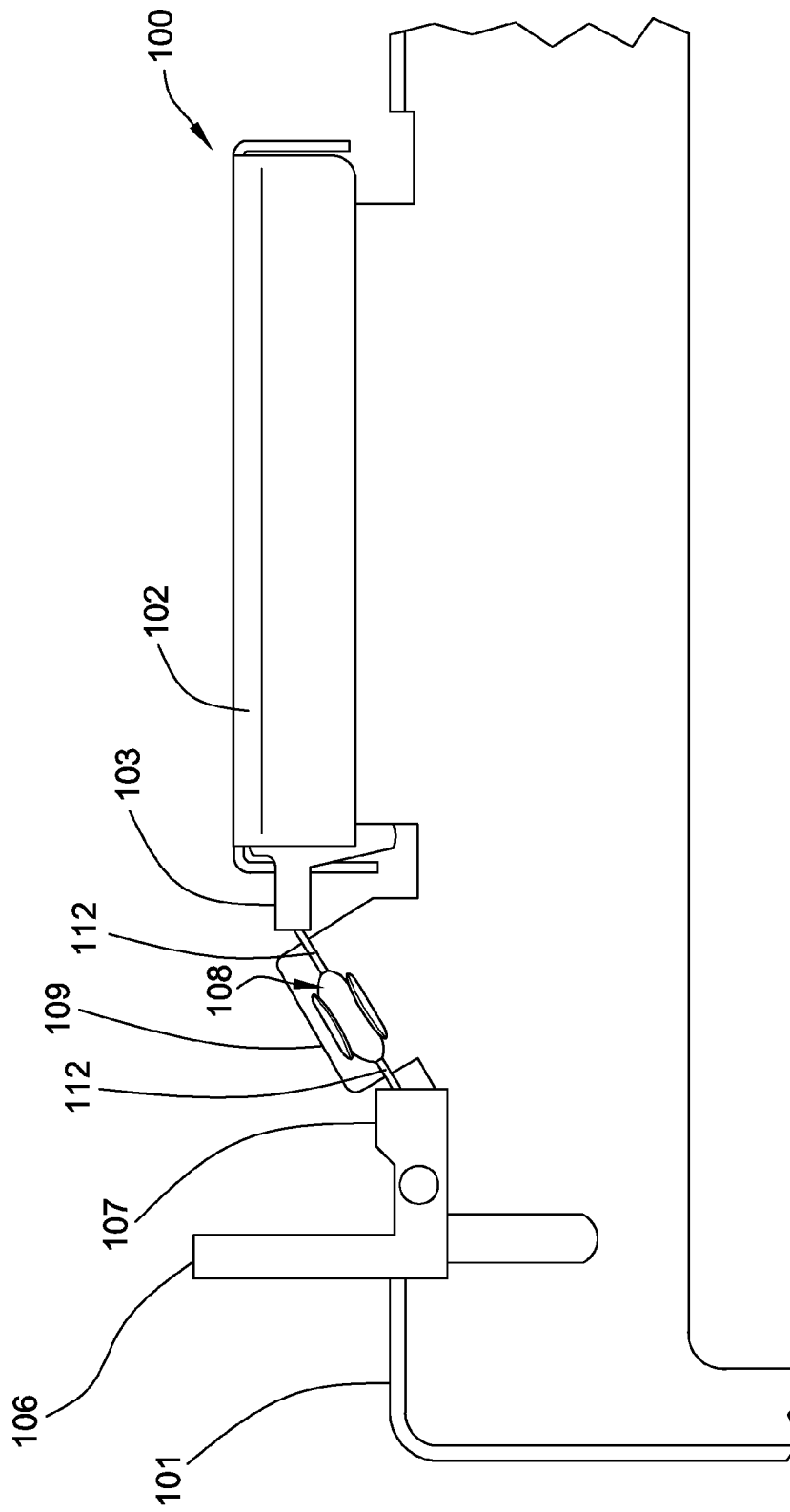
FIG. 1 is a fragmentary perspective view of a prior art battery cell plate frame assembly.

Referring to FIG. 1, there is shown a battery cell plate frame assembly 100 comprising a molded plastic frame 101 that receives and supports a lead plate component of a battery cell. It includes a metallic conductive connector bracket 102 attached to one end of frame 101 and arranged to be in conductive contact with the lead plate (not shown). Connector bracket 102 includes fuse attachment tab 103. Connector bracket 102 is a metal stamping usually made of copper or a bi-metallic combination of copper and an alloy.

A terminal 106 is supported in spaced relation to the conductive connector bracket 102. It is supported on molded plastic frame 101 in electrically non-conductive, isolated relation to conductive connector bracket 102. Terminal 106 includes a fuse attachment tab 107. Terminal 106 is a metal stamping usually made of copper or a bi-metallic combination of copper and an alloy.

A conductive fuse 108 provides a conductive path between the connector bracket 102 and the terminal 106. As seen in FIG. 1, fuse 108 may be supported between connector bracket 102 and terminal 106 upon a plastic support 109 that may be integrally molded or separately attached to frame 101.

Fuse 108 includes a body, and wire leads 112. The leads 112 are soldered, brazed or welded respectively to fuse attachment tab 103 of connector bracket 102 and fuse attachment tab 107 of terminal 106 to complete the electrically conductive path between the connector bracket 102 and terminal 106.

The sub-assembly arrangement of the present disclosure is illustrated in FIGS. 2 to 6. The complete battery plate frame assembly 300 comprises a molded plastic frame 301 and a sub-assembly 315 joined together by an overmolding process during molding of plastic frame 301. It comprises an improved and cost effective arrangement to create a battery cell plate frame assembly. It eliminates the possible contamination associated with metal shearing during the assembly process, and permits immediate verification of the integrity of the connecting fuse prior to the sub-assembly being integrated with the battery cell plate frame. In addition, it includes a bridge component that integrates the fuse and associated conductive components.

FIGS. 3 to 6 illustrate a sub-assembly 315 in accordance with the disclosure. It includes connector bracket 302, terminal 306, interposed fuse 308 and bridge element 316. Bi-metallic connector bracket 302 has a planar attachment leg 356 with an edge 366 (seen in FIG. 4) forming a projection to connect to the bridge as will be explained. It includes generally "vee" shaped fuse wire placement holders 303 and defines a flat surface or tab 313 on leg 356 for connection of a fuse.

Figures 5, 6:
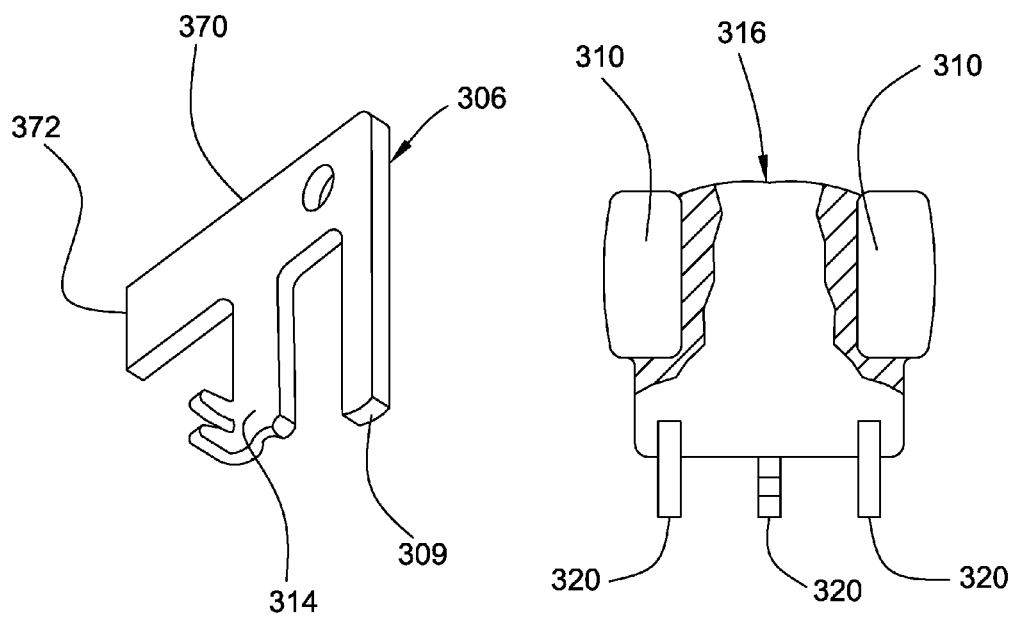
FIG. 5 is a perspective view of the terminal of the battery cell plate frame assembly of FIG. 3.
FIG. 6 is a perspective view, partially in section, of the bridge of the sub-assembly of FIG. 3.

Sub-assembly 315 further includes a separate metallic terminal 306 defining connector pin 309 as illustrated in FIG. 5. It includes a planar body 370 with an edge 372 forming a projection to connect to the bridge as will be explained. It also may include a hole 373 to secure the sub-assembly within the battery plate frame assembly. It includes generally "vee" shaped fuse wire placement holders 307. Terminal 306 also defines a flat surface or tab 314 for connection to a fuse.

Sub-assembly 315 further includes a non-conductive molded plastic bridge 316 interposed between connector bracket 302 and terminal 306. It is made of molded plastic and includes molded grasping prongs 320. It defines spaced slots 310 which receive planar attachment leg 356 at edge 366 of connector bracket 302 and planar body 370 at edge 372 of terminal 306. The slots in bridge 316 are sized to frictionally grasp the planar surfaces 356 and 370 at edges 366 and 372 to secure the conductive bracket 302 and terminal 306 to bridge 316.

Figure 3:
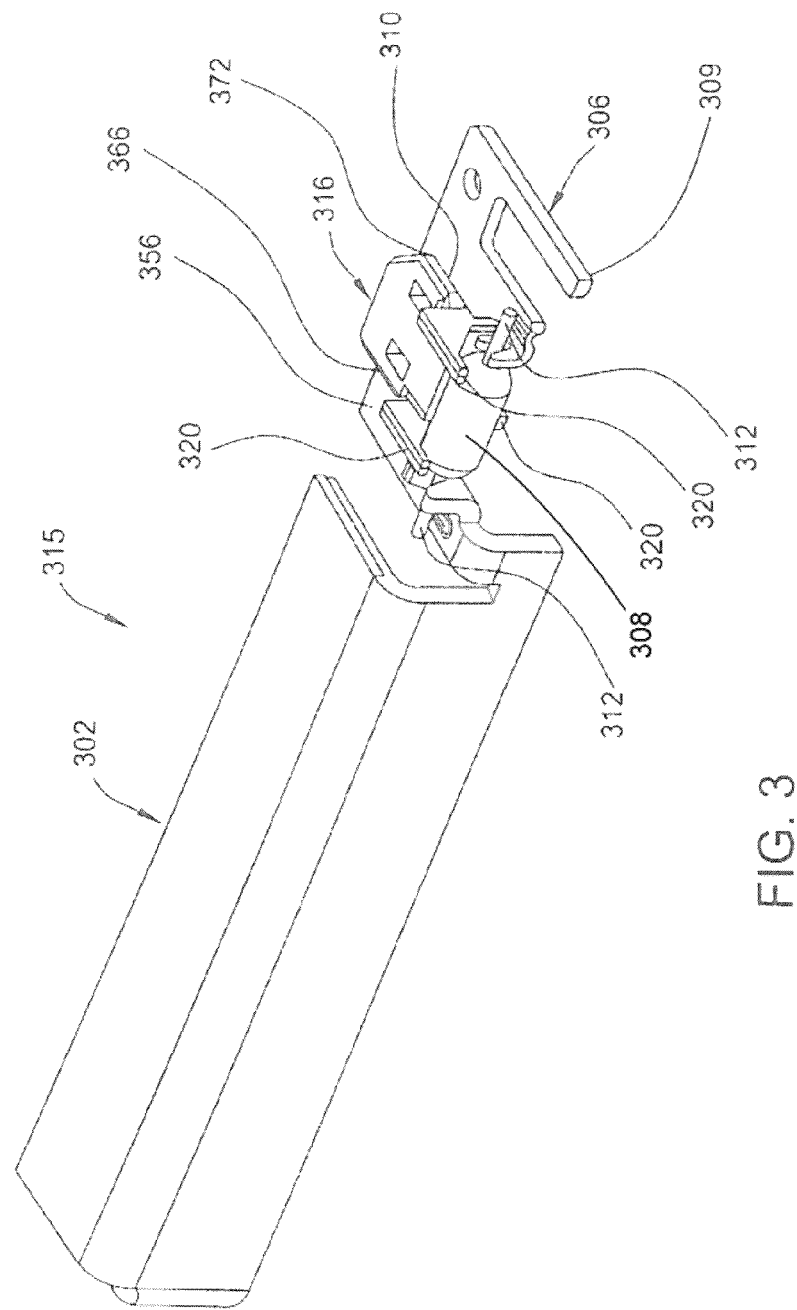
FIG. 3 is a perspective view of a sub-assembly for a battery cell plate frame assembly illustrating the principles of the present disclosure.
Figure 4:
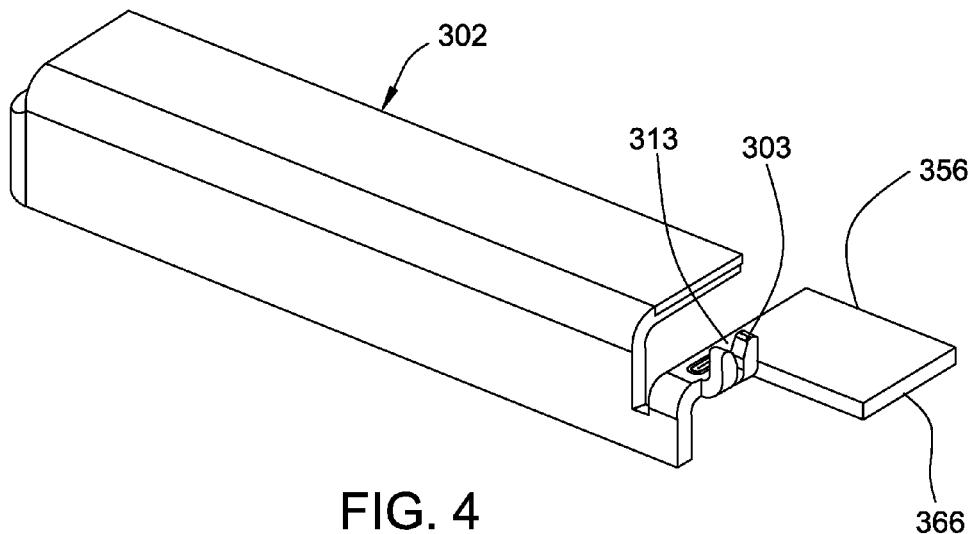
FIG. 4 is a perspective view of the connector bracket of the battery cell plate frame assembly of FIG. 3.

As seen in FIG. 3, a conductive fuse 308 is supported by the molded grasping prongs 320 on bridge 316. The fuse 308 snaps into place within the prongs where it is releasably held. Fuse 308 includes wires 312 soldered, brazed or welded to flat surface or tab 313 on connector bracket 302 and flat surface or tab 314 on terminal 306 to complete the sub-assembly 315. Placement holders 303 and 307 assist in alignment of connection wires 312 for this step of the assembly process.

Figure 2:
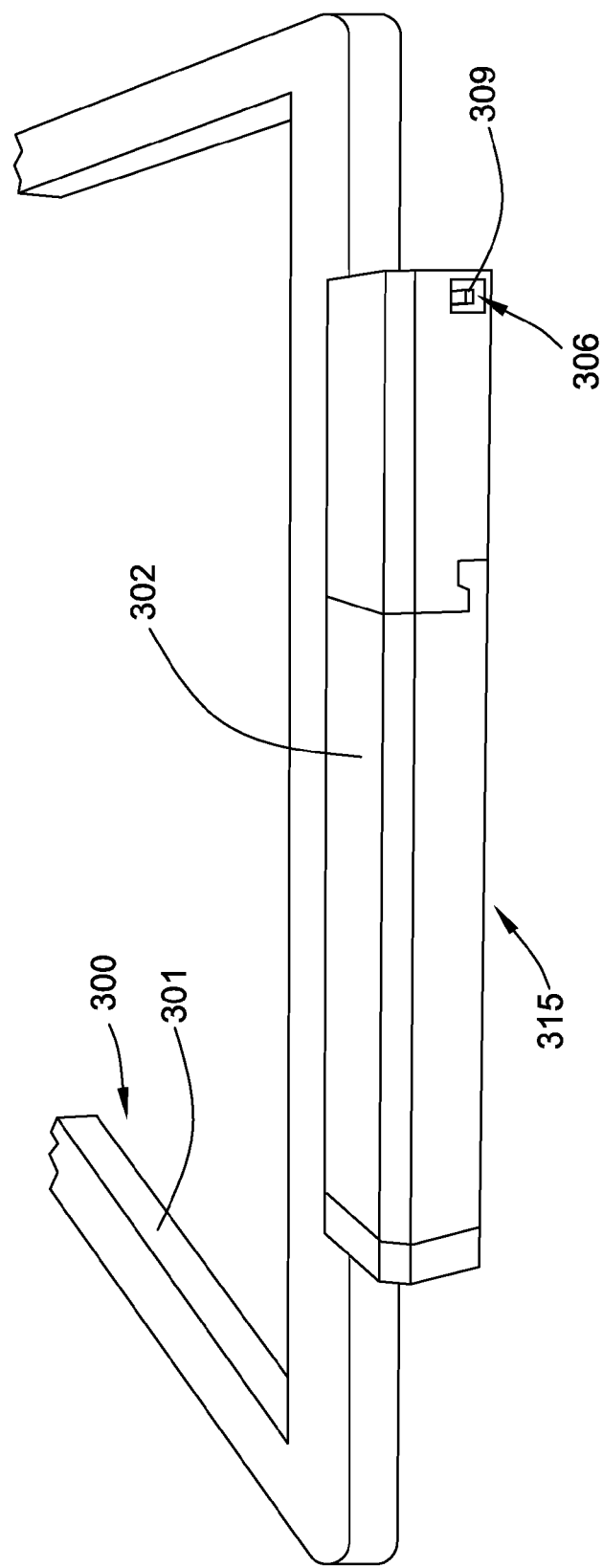
FIG. 2 is a perspective view of a battery cell plate frame assembly illustrative of the present disclosure.

To form a battery cell plate frame assembly, sub-assembly 315 is placed into a mold for plastic battery cell plate frame such as frame 301 of FIG. 2. The sub-assembly 315 is secured to the resultant frame 301 by an overmolding process while the frame is molded, eliminating any extra assembly steps. The fuse 308, and plastic bridge 316 are completely encapsulated integral to the plastic frame 301 by a molded encasement. The connector bracket 302, and terminal pin 309 of terminal 306 are appropriately exposed for further connection other components of the completed battery.

Importantly, in sub-assembly 315 the only conductive path between connector bracket 302 and terminal 306 is through fuse 308. Testing the integrity of the fuse 308 can immediately be confirmed with appropriate low voltage electrical test equipment prior to molding of the sub-assembly 315 into a plastic frame of a battery plate frame assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A battery plate frame assembly, comprising:
   a molded non-conductive frame;
   a separate sub-assembly joined with said molded non-conductive frame comprising;
      a conductive cell plate connector bracket;
      a conductive terminal;
      a fuse element electrically connected between said connector bracket and said terminal; and
      a non-conductive bridge element separately connected to said conductive cell plate connector bracket, said conductive terminal and said fuse element.

2. A battery plate frame assembly comprising:
   a molded non-conductive frame;
   a sub-assembly joined with said frame comprising:
      a conductive cell plate connector bracket
      a conductive terminal;
      a fuse element electrically connected between said connector bracket and said terminal;
      a bridge element separately supporting each of said sub-assembly components thereon
   wherein said connector bracket includes a planar portion and said bridge includes a first slot, and said planar portion of said connector bracket is disposed in said slot first of said bridge.

3. A battery plate frame assembly as claimed in claim 2, wherein said terminal includes a planar portion and said bridge includes a second slot and said planar portion of said terminal is disposed in said second slot of said bridge.

4. A battery plate frame assembly as claimed in claim 3 wherein said bridge includes a series of grasping prongs and said fuse is releasably supported in said grasping prongs.

5. A battery plate frame assembly as claimed in claim 4 wherein said fuse includes a wire soldered to said connector bracket and a wire soldered to said terminal.

6. A battery plate frame assembly as claimed in claim 5 wherein said connector bracket and terminal each include placement holders and said fuse wire connected to said connector bracket is disposed between said placement holders on said connector bracket, and said wire connected to said terminal is disposed between said placement holders on said terminal.

7. A battery plate frame assembly as claimed in claim 6 wherein said sub assembly is joined to said frame by overmolding.

8. A sub-assembly for connection to a battery plate frame assembly comprising:
   a conductive cell plate connector bracket;
   a conductive terminal;
   a fuse element electrically connected between said connector bracket and said terminal;
   a bridge element separately supporting each of said sub-assembly components,
   wherein said connector bracket includes a planar portion and said bridge includes a first slot, and said planar portion of said connector bracket is disposed in said first slot of said bridge.

9. A sub-assembly as claimed in claim 8, wherein said terminal includes a planar portion and said bridge includes a second slot and said planar portion of said terminal is disposed in said second slot of said bridge.

10. A sub-assembly as claimed in claim 9, wherein said bridge includes a series of grasping prongs spaced and said fuse is releasably supported in said grasping prongs.

11. A sub-assembly as claimed in claim 10 wherein said fuse includes a wire soldered to said connector bracket and a wire soldered to said terminal.

12. A sub-assembly as claimed in claim 11, wherein said connector bracket and terminal each include placement holders, said fuse wire connected to said connector bracket is disposed between said placement holders on said connector bracket and said wire connected to said terminal is disposed between said placement holders on said terminal.

13. A method of making a sub-assembly for a battery cell plate frame assembly comprising a conductive cell plate connector bracket; a conductive terminal; a fuse element electrically connected between said connector bracket and said terminal; a bridge element separately supporting each of said sub-assembly components;

the steps comprising:
supporting said conductive bracket on said bridge;
supporting said terminal on said bridge;
supporting said fuse on said bridge;
connecting said fuse to said connector bracket and to said terminal,
wherein said connector bracket includes a planar portion and said bridge includes a first slot, the steps further comprising disposing said planar portion of said connector bracket in said slot of said bridge.

14. A method of making a sub-assembly for battery cell plate frame assembly as claimed in claim 13, wherein said terminal includes a planar portion and said bridge includes a second slot, the steps further comprising disposing said planar portion of said terminal in said second slot of said bridge.

15. A method of making a sub-assembly for a battery cell plate frame assembly as claimed in claim 14, wherein said bridge includes a series of grasping prongs the steps further comprising releasably supporting said fuse in said grasping prongs.

16. A method of making a sub-assembly for a batter cell plate frame as claimed in claim 15 wherein said fuse includes wires, the steps further comprising securing a wire of said fuse to said connector bracket and securing a wire of said fuse to said terminal.

17. A method of making a sub-assembly for a battery plate frame as claimed in claim 16 wherein said connector bracket and terminal each include placement holders, the steps comprising disposing said wires of said fuse secured to said connector bracket and terminal between said placement holders.

18. A method of making a battery cell plate frame assembly, the steps comprising:
providing a separate sub-assembly comprising:
a conductive ceil pate connector bracket;
a conductive terminal;
a fuse element electrically connected between said connector bracket and said terminal; and
a non-conductive bridge element separately connected to said conductive cell plate connector bracket, said conductive terminal and said fuse element and connecting said sub-assembly to sad frame.

\* \* \* \* \*